N. W. TRUXAL.
OPERATING MECHANISM FOR CIRCUIT CONTROLLERS.
APPLICATION FILED JUNE 13, 1907.
914,535.
Patented Mar. 9, 1909.
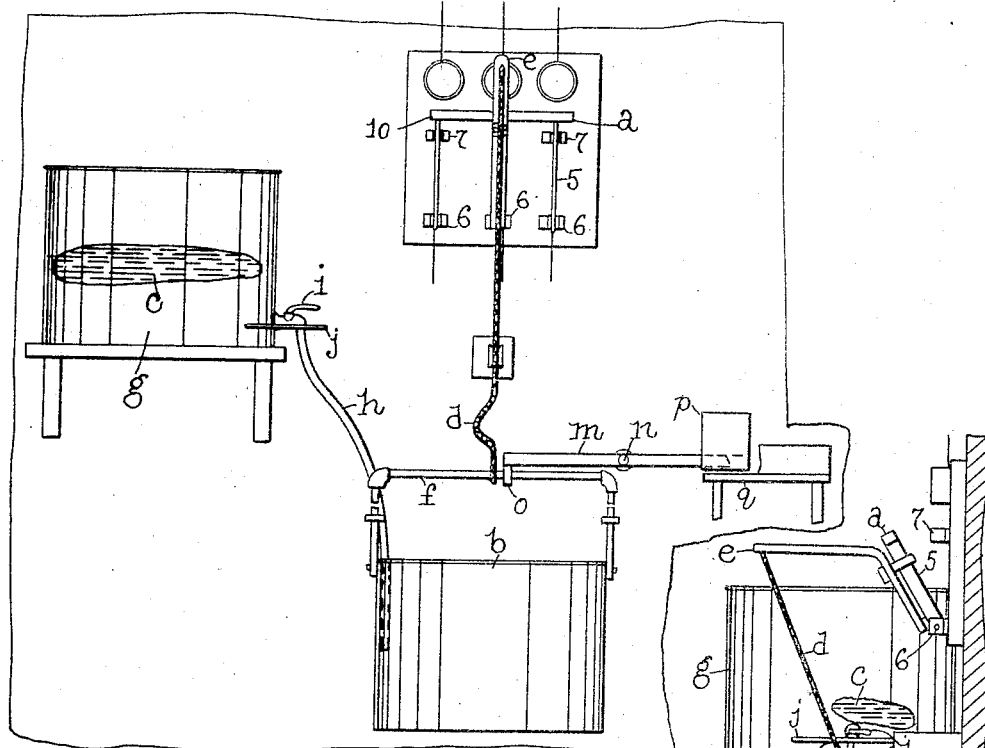
Fig. 1.
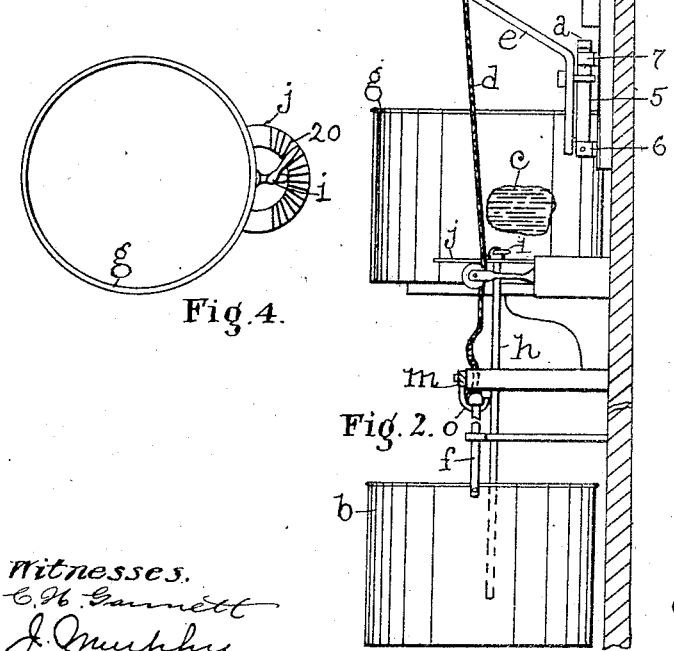
Fig. 4.
Fig. 2.
Fig. 3.
Witnesses.
C. H. Gannett
J. Murphy
Inventor.
Norval W. Truxal
by Jas. H. Churchill
atty.

UNITED STATES PATENT OFFICE.

NORVAL W. TRUXAL, OF BOSTON, MASSACHUSETTS.

OPERATING MECHANISM FOR CIRCUIT-CONTROLLERS.

No. 914,535.     Specification of Letters Patent.     Patented March 9, 1909.

Application filed June 13, 1907. Serial No. 378,712.

*To all whom it may concern:*

Be it known that I, NORVAL W. TRUXAL, a citizen of the United States, residing in Boston, in the county of Suffolk and State of Massachusetts, have invented an Improvement in Operating Mechanism for Circuit-Controllers, of which the following description, in connection with the accompanying drawings, is a specification, like characters on the drawings representing like parts.

This invention relates to an electric circuit controller and has for its object to provide a simple and efficient mechanism for automatically operating the circuit controller at a predetermined interval of time. To this end, the movable member of the circuit controller which may be of any suitable or desired construction, is connected with a receptacle in which material is permitted to accumulate until a weight is obtained sufficient to operate the circuit controller. The material referred to may be water, sand, etc., which is fed to the receptacle at a given rate, so that a predetermined amount of time elapses before the weight of the receptacle is such as to effect the operation of the circuit controller. Provision is made for relieving the circuit controller from the weight until the proper time has elapsed to operate the circuit controller. These and other features of this invention will be pointed out in the claim at the end of this specification.

Figure 1 is an elevation of one form of circuit controller and its operating apparatus embodying this invention. Fig. 2, a side elevation of the apparatus shown in Fig. 1. Fig. 3, a side elevation of the apparatus shown in Fig. 1, with the circuit controller in its opened position, and Fig. 4, a detail to be referred to.

Referring to the drawing $a$ represents the movable member of a circuit controller, which may be of any suitable or desired construction and is herein shown as a three pole switch comprising three contact blades 5 pivoted to stationary lugs or terminals 6, and coöperating with three sets of contact fingers 7, the contact blades 5 being joined by a cross bar 10.

The movable member $a$ of the switch or circuit controller is adapted to be moved into its open position by a weight which is accumulative, that is, which requires a predetermined time for obtaining the proper weight to operate the switch. The accumulative weight may be obtained by providing a receptacle, such as a pail $b$, in which water, sand, or other material $c$ is permitted to accumulate at a given rate, and which pail is operatively connected with the movable member $a$ of the circuit controller by a cord $d$ or other flexible connection, the said cord being shown as fastened at one end to an arm $e$ attached to the movable member $a$ of the switch, and at its other end to the bail $f$ of the pail. The water, sand or other material $c$ may be supplied to the pail $b$ from a vessel $g$ through a pipe $h$ having a suitable valve $i$, which controls the flow of the material to the pail. The material referred to is represented in the present instance as water. The valve $i$ may coöperate with a suitable device $j$ for indicating the time required for the water or other material to accumulate in the pail to obtain the weight desired or required for operating the circuit controller.

Provision is made for relieving the contact fingers 7 from strain, that is, for preventing them from weakening under the influence of the weight as it accumulates. In the present instance, I have shown one means for accomplishing this result. To this end, I have provided a lever $m$ pivoted at $n$ and having one end provided with a hook $o$ to engage the bail $f$ and having its other end extended under a weight $p$, hereinshown as resting on a bracket or support $q$.

The weight $p$ is designed to nearly counterbalance the combined weight of the pail $b$ and its contents when the latter reaches a predetermined amount, so that as the water $c$ accumulates in the pail and approximates the desired amount, the lever $m$ is turned on its pivot so as to lift the weight $p$, until the combined weight of the pail and its contents overcomes the weight $p$, at which time the rear end of the lever $m$ is elevated to such an angle as to disengage itself from the weight $p$, whereupon the pail $b$ drops, straightens the cord $d$ and moves the member $a$ of the switch into its open position, represented in Fig. 3. The counterbalancing weight $p$ may be dispensed with, and the pail sustained by the contact fingers 7 alone, but I prefer to use the weight $p$, as the contact fingers 7 are relieved from strain, and not weakened by continued use.

The device $j$ may be provided with suitable marks or graduations 20 indicative of different times required to obtain a given weight in the pail, so that if it is desired to vary the length of time required to open the switch, the valve *i* may be moved to permit a greater or less quantity of the water to flow into the pail in the time selected. The downward movement of the pail or receptacle *b* may be arrested by a suitable stop 30.

I have herein shown one construction of apparatus embodying this invention, but I do not desire to limit the invention in this respect.

Claim.

The combination with the movable member of a circuit controller, of a receptacle, a flexible connection joining said receptacle and member, a lever to support said receptacle, a weight acting on said lever in opposition to said receptacle, and automatically disengaged from the said lever by the fluid in said receptacle, a receptacle containing fluid, an outlet for said receptacle communicating with the first mentioned receptacle, and a valve to control the flow of fluid from the second mentioned receptacle into the first mentioned receptacle, substantially as described.

In testimony whereof, I have signed my name to this specification in the presence of two subscribing witnesses.

NORVAL W. TRUXAL.

Witnesses:
J. MURPHY,
M. B. MAY